July 12, 1960

D. FOTHERINGHAM 2,944,837

AIRCRAFT TOWING DEVICE

Filed March 24, 1958

INVENTOR

*Douglas Fotheringham*

BY
*Burns, Doane, Benedict & Irons*
ATTORNEYS

United States Patent Office 2,944,837
Patented July 12, 1960

2,944,837
AIRCRAFT TOWING DEVICE
Douglas Fotheringham, 1152 N. 10th St., Laramie, Wyo.

Filed Mar. 24, 1958, Ser. No. 723,419

5 Claims. (Cl. 280—503)

This invention pertains to a towing device connectable to an aircraft nose wheel and, more particularly, to such a device having a bifurcated end engageable with the opposite ends of a steerable wheel to permit the aircraft to be towed manually or by a suitable prime mover.

Various types of bifurcated aircraft towing handles which have been developed heretofore are characterized by certain disadvantages including structural complexity, difficulty of manipulation, susceptibility to mechanical failure, and expense of manufacture.

To overcome the disadvantages of prior art devices, it is a general object of this invention to provide an improved aircraft towing handle which is compact, light in weight, inexpensive to manufacture, mechanically sturdy, and easy to manipulate.

A further object of the invention is to provide an improved towing device which may be operably connected to an aircraft wheel by a single unidirectional movement of an operating member, which movement not only effects engagement of the gripping end of the device with the aircraft axle, but positively locks it in gripping position.

It is a specific object of this invention to provide an improved aircraft towing device which is extensible to an operative condition from a collapsed storage condition and which embodies a gripping portion movable into and out of aircraft wheel engaging position in response to such extension and collapse.

Generally described, the aircraft towing device of the invention includes means comprising a generally U-shaped handle, means comprising a pair of spaced members telescopically, but non-removably, engaging the legs of said handle, said members being connected to prevent relative lateral and longitudinal movement of the inner ends thereof, and a pair of spaced opposed wheel engaging elements carried by and relatively laterally movable with one of said means from extended disengaged positions to retracted wheel engaging positions. The first and second named means are cooperable to effect movement together and apart of the wheel engaging elements when said means are telescoped outwardly and inwardly respectively.

Preferably, the apparatus of the invention is collapsible to an inoperative storage position and is so constructed that the act of extension from a collapsed to an operable position simultaneously effects movement together of the wheel engaging elements.

Figure 1:
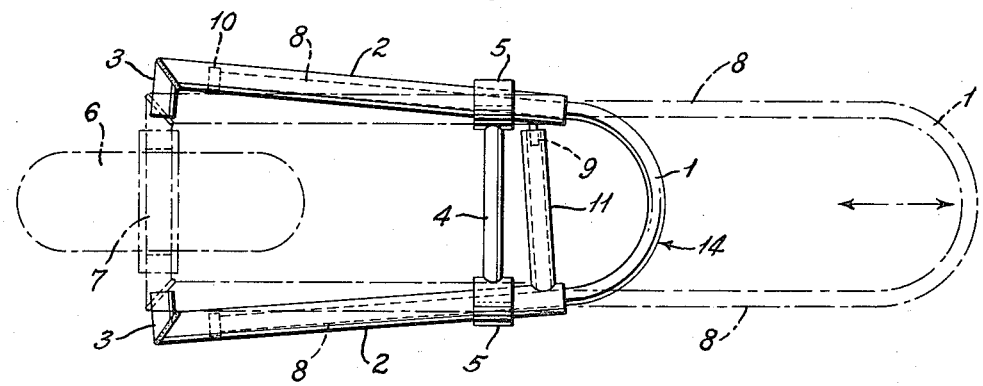
Figure 2:
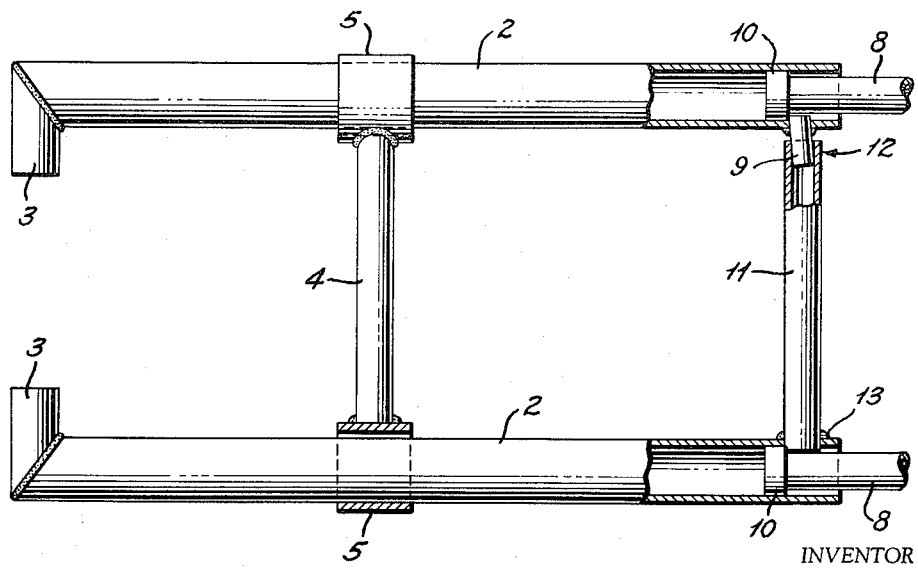

The invention having been generally described, a preferred specific embodiment for accomplishing the stated objects will now be described in detail with reference to the accompanying drawings in which:

Figure 1 is a plan view of an aircraft towing device according to the invention; and Figure 2 is a fragmentary plan view partially in section of the device shown in Figure 1.

With reference to the drawings, a pair of elongate tubular arm members 2 have opposed wheel engaging elements 3 affixed to the free outer ends of such members. These free ends are relatively laterally movable to permit movement of the elements 3 into and out of engagement with opposite ends of an axle 7 of a steerable aircraft wheel 6. Transverse member 11 is rigidly connected as by welding to the inner ends of one of the arm members 2 at joint 13. An end portion of the member 11 is hollow to permit loose telescopic assembly with a plug 9 which is rigidly affixed to the inner end of the other arm member 2 as by welding. The telescopic fit between plug 9 and member 11 is sufficiently loose to permit the arms 2 to be pivoted to move their outer ends laterally between the positions shown in solid and dotted lines in Figure 1. When the arms 2 are moved inwardly to the dotted line positions, the elements 3 are moved into wheel engaging positions. Conversely, when the arms 2 are moved to the solid line positions, the elements 3 are moved to inoperative positions. With reference to Figure 2, the longitudinal axis of plug 9 is slightly inclined relative to the longitudinal axis of the arm member 2 when the elements 3 are in wheel engaging positions. This inclination is sufficient to effect sufficient frictional engagement between plug 9 and member 11 to prevent lateral separation of the inner ends of the arm members 2. However, when the arms 2 are moved outwardly until the elements 3 are in inoperative positions, the axis of the plug 9 substantially coincides with the axis of transverse member 11.

Also connecting the arms 2 is a non-extensible member or slide lock 4. The slide lock 4 includes a pair of sleeves 5 slideably engaging arm members 2, thus rendering the slide lock movable longitudinally along the arms 2 from one end to the other. When the slide lock 4 is positioned adjacent transverse member 11, separation of members 11 and 9 and thus the inner ends of arms 2 is precluded even when the arms 2 are in diverged positions. When the slide lock 4 is positioned adjacent the wheel engaging elements 3, it locks the outer ends of the arms 2 against relative lateral movement.

The telescopically engaged members 9 and 11 and slide lock 4 in combination form means to prevent relative lateral and longitudinal displacement of the inner ends of the arms 2 but to permit relative pivotal movement of said arms to move the elements 3 into and out of wheel engaging positions.

It is apparent, however, that the slide lock may be eliminated and relative lateral movement of the inner ends of arms 2 may be prevented by providing stop means to preclude removal of plug 9 from member 11 or by replacing the plug 9 with any element pivotally but non-removably connecting the member 11 to the arm 2 at joint 12 such as a ball and socket connection.

A generally U-shaped extensible actuating handle 14 is provided which includes a grip 1 at the base of the U. Extending from the grip 1 are elongate relatively stiff leg members 8 which are normally resiliently retained by the grip 1 and their own stiffness in diverging positions. The handle 14 is telescopically assembled with the remainder of the towing device by forcing the leg members 8 relatively inwardly and then inserting them into the tubular members 2. Separation of leg members 8 and arm members 2 is prevented by engagement between enlarged portions 10 of the free ends of leg members 8 with abutments formed by the ends of the plug 9 and the member 11 which extend into the space within tubular arm members 2. Thus, the arms 2 and legs 8 are relatively non-removable, i.e., non-removable under normal operating conditions but not necessarily incapable of disassembly. Alternatively to the disclosed embodiment, any other suitable means may be provided to prevent removal of legs 8 from arms 2.

The spacing between the sleeves 5 of the slide lock 4 and also between the inner ends of the arms 2 is at least as great as the spacing between the legs 8 at the base of the U and less than the spacing between the outer ends of the legs 8 when in normal, fully diverged positions. Thus, when the slide lock 4 is adjacent the member 11 and the handle 14 is inserted far enough into the arms 2, the outer ends of the legs 8 will be permitted to move outwardly pulling with them the outer ends of the arms 2, thus moving the elements 3 into extended inoperative positions.

When it is desired to secure the subject device to an aircraft wheel, it is first aligned with the wheel engaging elements 3 disposed in inoperative positions at opposite ends of the wheel axle 7. The operator then pulls the handle 14 outwardly relative to arm members 2. The normally diverged legs 8 are pulled inwardly by the connected and laterally unmovable inner ends of the arms 2. The convergence of the rigid leg members 8 moves the free ends of arm members 2 inwardly, thereby bringing the elements 3 into wheel engaging positions. The slide lock 4 may then be moved outwardly toward the elements 3 to positively lock the outer ends of the arms 2 against separation. Separation of the inner ends of arms 2 is then precluded by the frictional engagement between plug 9 and member 11.

It is apparent that the device may also be utilized without extending the handle. The wheel engaging ends of arm members 2 may be moved together into wheel engaging positions simply by movement of the slide lock toward these ends. Separation of the inner ends of the arms 2 during the initial movement of the slide lock 4 is precluded by the grip 1, the latter then being adjacent the member 11. The aircraft may thus be towed without extending the handle 14 by grasping the member 11 which then functions as the handle.

It is apparent that the connected arms 2 and the handle 14 are cooperable to effect movement together and apart of the outer ends of arms 2 and thus the wheel engaging elements 3 by telescoping the arms and handle to extended and collapsed positions, respectively. In extended position, the device is easy to manipulate; and in collapsed position, it may be conveniently stored in a small aircraft storage compartment.

Several possible modifications of the Figure 2 device may be made within the scope of this invention. For example, through suitable structural modifications, arm members 2 may be telescoped within leg members 8.

It is also within the scope of my invention to rigidly connect the inner ends of the arms 2 with said arms being resiliently retained with their outer ends converging. Thus, the transverse member 11 would be rigidly fixed to arm members 2 at both joints 12 and 13. A U-shaped handle would be employed having legs stiffer than the arms 2 and with free ends spaced apart a distance greater than the normal spacing of the outer ends of arms 2. Thus, when the stiff leg members 8 are telescoped into arms 2, the free ends of members 2 and thus the elements 3 would be forced apart. Movement of members 8 out of arm members 2 would permit the wheel engaging elements 3 to converge to wheel engaging positions.

While the invention has been described with respect to a specific preferred embodiment, it will be understood that the invention is not limited to the details shown and described but is determined by the scope of the appended claims.

I claim:

1. An aircraft towing device which, in combination, comprises means including a pair of spaced elongate arms having relatively laterally movable outer ends and a pair of opposed wheel engaging elements at said outer ends and a connection between the inner ends of said arms to prevent relative lateral and longitudinal displacement of said inner ends, said elements being movable into and out of wheel engaging relationship by said lateral movement of said arms, and means comprising a generally U-shaped handle having a pair of stiff legs telescopically but non-removably engaging the inner ends of said arms for movement between collapsed storage and extended operative positions, said handle including resilient means to urge the outer ends of said legs outwardly to normally hold said arms outwardly with said elements out of wheel engaging relationship when said handle and arms are collapsed, said connection retaining the outer ends of said legs inwardly against said resilient urging to hold said arms inwardly with said elements in wheel engaging relationship when said handle and arms are extended.

2. An aircraft towing device which comprises a pair of spaced elongate arms having a pair of opposed aircraft wheel engaging elements at the outer ends of said arms, means connecting said arms to prevent relative lateral and longitudinal displacement of the inner ends of said arms but to permit relative pivotal movement of said arms to effect relative lateral displacement of said elements, a generally U-shaped handle having a pair of stiff legs normally resiliently urged to a diverging relationship and telescopically but non-removably engaging the inner ends of said arms for movement between collapsed storage and extended operative positions, said legs being diverged to spread the outer ends of said arms when said handle is in collapsed position and being drawn inwardly by the connected inner ends of said arms to move the outer ends of said arms inwardly when said handle is in extended position.

3. Apparatus as recited in claim 2 wherein said connecting means includes a member slideable outwardly along said arms to lock the outer ends of said arms against laterally outward movement.

4. Apparatus as recited in claim 2 wherein said elongate arms are tubular and said stiff legs are telescopically assembled within the inner ends of said arms.

5. Apparatus as recited in claim 4 wherein said connecting means includes a member having a pair of sleeves for receiving said tubular arms, said member being slideable outwardly along said arms to lock the outer ends of said arms against laterally outward movement.

References Cited in the file of this patent
UNITED STATES PATENTS

| | | |
|---|---|---|
| 2,287,955 | Zunino | June 30, 1942 |
| 2,391,608 | Wood | Dec. 25, 1945 |
| 2,449,680 | Wak et al. | Sept. 21, 1948 |
| 2,692,149 | Wilcox | Oct. 19, 1954 |
| 2,773,703 | Ferguson et al. | Dec. 11, 1956 |